US009284007B2

(12) United States Patent
Belenkov et al.

(10) Patent No.: US 9,284,007 B2
(45) Date of Patent: Mar. 15, 2016

(54) MODULAR RECUMBENT VEHICLE

(76) Inventors: Alexandre Belenkov, Toronto (CA);
Eugene Belenkov, Toronto (CA); Anna Belenkova, Toronto (CA)

( * ) Notice: Subject to any disclaimer, the term of this patent is extended or adjusted under 35 U.S.C. 154(b) by 131 days.

(21) Appl. No.: 13/261,346

(22) PCT Filed: Jan. 17, 2011

(86) PCT No.: PCT/CA2011/000050
§ 371 (c)(1),
(2), (4) Date: Jul. 3, 2012

(87) PCT Pub. No.: WO2011/103656
PCT Pub. Date: Sep. 1, 2011

(65) Prior Publication Data
US 2012/0318595 A1    Dec. 20, 2012

(30) Foreign Application Priority Data

Feb. 24, 2010  (CA) ..................... 2694421

(51) Int. Cl.
| | |
|---|---|
| *B62K 13/00* | (2006.01) |
| *B62K 15/00* | (2006.01) |
| *B62K 7/04* | (2006.01) |
| *B62B 15/00* | (2006.01) |
| *B62K 3/00* | (2006.01) |
| *B62K 5/06* | (2006.01) |
| *B62K 13/04* | (2006.01) |
| *B62K 13/06* | (2006.01) |

(Continued)

(52) U.S. Cl.
CPC .................. *B62K 7/04* (2013.01); *B62B 15/003* (2013.01); *B62B 15/005* (2013.01); *B62K 3/005* (2013.01); *B62K 5/06* (2013.01); *B62K 13/04* (2013.01); *B62K 13/06* (2013.01); *B62K 13/08* (2013.01); *B62K 15/00* (2013.01); *B62K 15/006* (2013.01); *B62B 2206/006* (2013.01); *B62K 2003/125* (2013.01); *B62K 2015/001* (2013.01)

(58) Field of Classification Search
CPC ...... B62K 3/12; B62K 2003/125; B62K 5/02; B62K 5/06; B62K 7/04; B62K 13/00; B62K 13/02; B62K 13/04; B62K 13/06; B62K 2015/001; B62K 27/12; B62K 2204/00; B62K 2710/16
USPC ......... 280/278, 287, 282, 292, 30, 7.15, 7.16, 280/7.17, 209, 230, 231, 202, 1.188
See application file for complete search history.

(56) References Cited

U.S. PATENT DOCUMENTS

| | | | | |
|---|---|---|---|---|
| 264,855 | A | * | 9/1882 | Burley .......................... 280/231 |
| 556,168 | A | * | 3/1896 | Taylor .......................... 280/209 |
| 750,480 | A | * | 1/1904 | McLarty ....................... 280/209 |

(Continued)

FOREIGN PATENT DOCUMENTS

GB          1592850       * 12/1977

*Primary Examiner* — Anne Marie Boehler (57) ABSTRACT

Modular human powered recumbent vehicle has a variable configuration and size. It comprises a group of standardized modules—fast attachable parts connected together by set of cross tubes (4) of variable length. It has three basic modules: middle (1), left (2) and right (3); each module has several modifications. One or more additional modules, like child seat (17), shopping basket (18), additional pedal (15) or electric (16) drive, also can be attached for performing a specific task. Vehicle can be transformed to a powered or unpowered trailer of variable configuration. It can be folded for storage and disassembled for transportation.

6 Claims, 10 Drawing Sheets

(51) Int. Cl.
  *B62K 13/08*     (2006.01)
  *B62K 3/12*      (2006.01)

(56) References Cited

U.S. PATENT DOCUMENTS

| | | | | |
|---|---|---|---|---|
| 3,768,834 A | * | 10/1973 | Singleton | 280/209 |
| 3,865,401 A | * | 2/1975 | Kingsly | 280/209 |
| 4,093,258 A | * | 6/1978 | Ansel | 280/231 |
| 4,290,620 A | * | 9/1981 | Chika | 280/209 |
| D289,271 S | * | 4/1987 | Hendrickson et al. | D12/112 |
| 4,834,410 A | * | 5/1989 | Parker | 280/209 |
| 5,342,074 A | * | 8/1994 | Amdahl et al. | 280/209 |
| 8,210,555 B2 | * | 7/2012 | Belenkov et al. | 280/287 |
| 8,292,317 B1 | * | 10/2012 | Winters | 280/292 |
| 2012/0181769 A1 | * | 7/2012 | James | 280/231 |

* cited by examiner

MODULAR RECUMBENT VEHICLE

TECHNICAL FIELD

The invention relates generally to human powered recumbent vehicles.

BACKGROUND OF THE INVENTION

Human power is one of the most ecologically friendly and healthy source of energy for transport. Two wheeled bicycles are very popular. Intending to expand the use of bicycles, market offers some additional accessories: a child seat, child and cargo trailers, travel bags, shopping baskets and so on.

While being more comfortable and safe for driving, recumbent trikes have even more features to be used for specific tasks. There is a small category of special recumbent vehicles patented and presented on the market: single-driver vehicles; tandem vehicles; passenger vehicles, like shown in U.S. Pat. No. 308, 499; cargo vehicles, like shown in the U.S. Pat. Nos. 4,863,183 or 4,740,004; electric tricycles and other.

All mentioned recumbent vehicles are designed for one specific task and transformation for performing another task is usually impossible.

It would be good to have a multifunctional vehicle that could be easily transformed to serve a different purpose, in accordance to the current situation. The best way to solve this issue would be to make a vehicle that has a modular structure, which would allow both the universality of use with minimization of size and weight.

The presented Modular Recumbent Vehicle has all of these features.

The Modular Recumbent Vehicle is a further development of the Folding Recumbent Vehicle described in Canadian Patent 2,628,222. New modular vehicle still has some features of the parent vehicle, such as a spring suspended and leaning seat, foot operated back pedaling brakes and a car-style steering mechanism; it also can be folded and disassembled. In the mean time, all of the features of modular design can be applied to all other, traditional recumbent trikes that have unsuspended seat, handlebar-style steering and hand operated brakes.

There are no other known patents related to the modular structure of recumbent vehicles.

DISCLOSURE OF INVENTION

The general idea of the invention is the grouping and standardization of the main parts of the recumbent vehicle for easy assembly of the vehicle of necessary size and configuration with ability to attach additional units to perform specific tasks.

The Modular Recumbent Vehicle is separated into three basic parts (modules), connected by three cross tubes. Longer cross tubes can be used to make the vehicle wider to accommodate additional modules. Connection is fast and universal for all modules.

Basic set of modules has the middle, left and right modules. Each module has a few modifications in order to have more options to build the variety of configurations.

The basic version of the middle module has a frame which has two parts coupled by the folding device. The frame holds the steered front wheel with steering mechanism, pedal chain drive. and a seat.

The left and right modules, each has a frame and a powered or unpowered wheel. Rotation to the powered wheel transmits via the chain transmission or directly to the axle of the wheel. In both cases the intermediate shaft of variable length transmits the rotation from the pedal or electric drive.

One or more additional modules can be attached for performing specific tasks. They can be: a passenger stand-seat, child seat, pet cage, shopping basket, carriage platform, child pedal drive, electric drive, sail, and any other unit or device. The variety of additional modules is virtually unlimited.

Each module has fast operated clamping devices for fixing to the cross tubes.

Modular vehicle can be transformed into a compact configuration for storage or disassembled for transportation.

A group of modules can be combined as a trailer of variable configuration. Two or more vehicles can be serially connected together. For this purpose the middle module has special modifications.

The given recumbent cycle has a simple frame; it does not have complicated parts and is based on the components of conventional bicycles, including wheels. It provides a relatively simple and inexpensive manufacturing process, easy packing and transportation. Modular structure also allows easy repair and upgrade of the vehicle by replacing only the necessary modules and parts.

Current patent describes only the delta-trike, having one front and two rear wheels. Other kind of tricycles named as tadpole trikes, having two front steering wheels and one rear powered wheel, can be modular as well. In this case the modules should be different and, instead of the intermediate shaft, tadpole trike must have steering cross-rods of variable length linking the front steered wheels with the steering mechanism (car-style or traditional bike-style). Variety of additional modules can be attached as well.

BRIEF DESCRIPTION OF THE DRAWINGS

FIG. 8 is an isometric view of clamping device: *a*) in opened position, *b*) in closed position.

FIG. 9 is a side view of the folding device: *a*) in folding position, *b*) in disconnected position.

FIG. 13: a) is a side view of the vehicle in the first stage of folding, b) is a rear view of the vehicle in the first stage of folding.

FIG. 14 is a side view of the vehicle in the second stage of folding.

FIG. 15 is a side view of the vehicle in the third stage of folding.

FIG. 16 is a side view of the vehicle in the fourth, final stage of folding for storage.

DETAILED DESCRIPTION OF THE INVENTION

FIGS. 1 through 33 illustrate the preferred embodiment of the invention.

Figure 1:
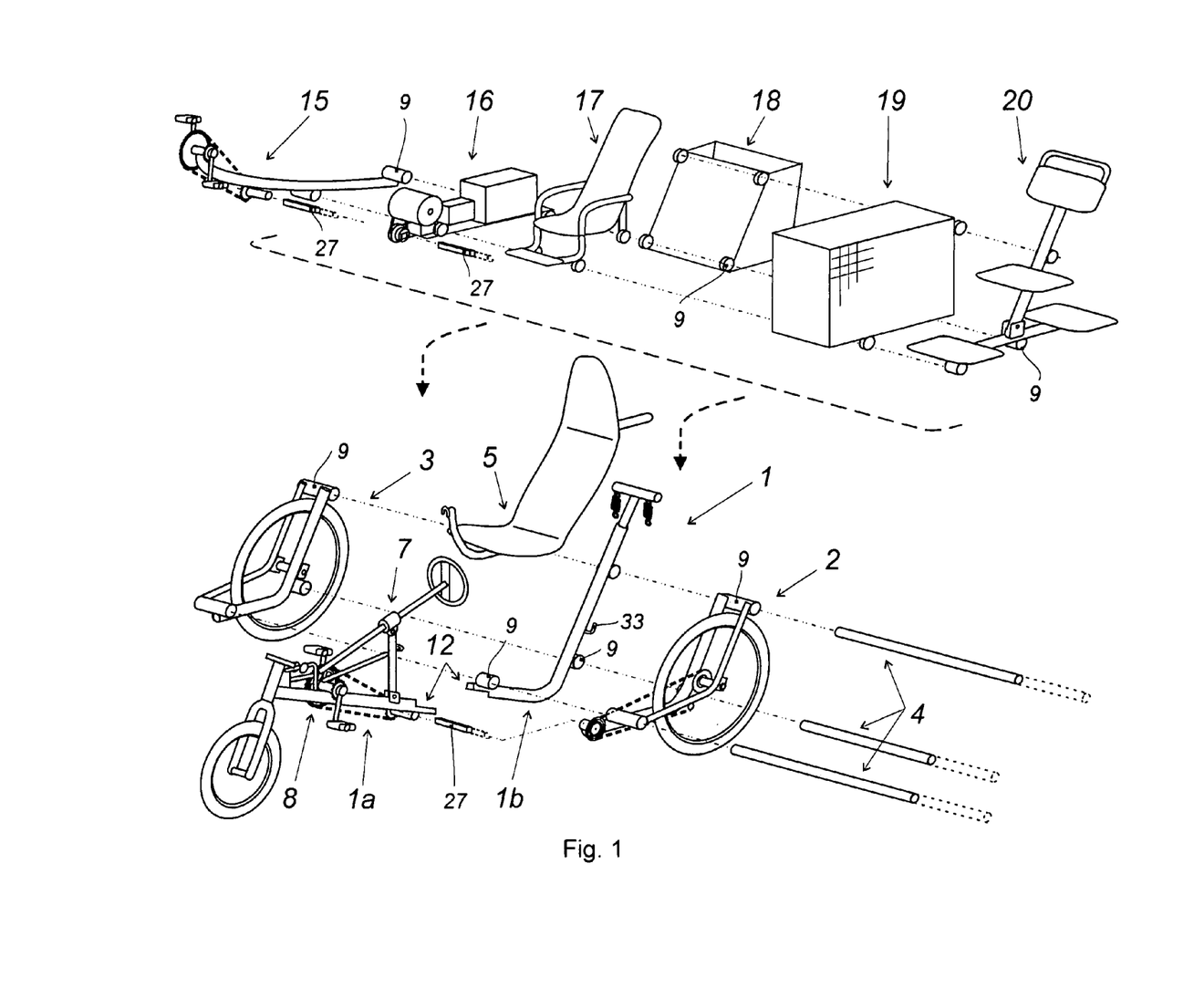
FIG. 1 is an isometric exploded simplified view of the vehicle illustrating its modular structure and the variety of additional modules.

FIG. 1 shows an isometric simplified view of the vehicle illustrating its modular structure and the variety of attachable additional modules.

The modular vehicle comprises the three basic modules: the middle module 1 including the front part 1a and back part 1b connected by a folding device 12; left module 2 and right module 3. Middle module has attachable seat 5. All three modules are connected together by a set of cross tubes 4 of variable length. Longer cross tubes can be used to make the vehicle wider 135 and to accommodate one or more additional modules 15-20. Each module has a few clamping devices 9 for fixing to the cross tubes. The intermediate shaft 27 transmits the rotation from middle module 1 to the wheel of the left module 2. Additional intermediate shafts 27 should be used to transmit the rotation from the child pedal drive 15 or the electric drive 16. The length of the shafts 27 is variable.

The basic modules (middle, left and right) have a few modifications shown in FIGS. 1-4.

Figure 2:
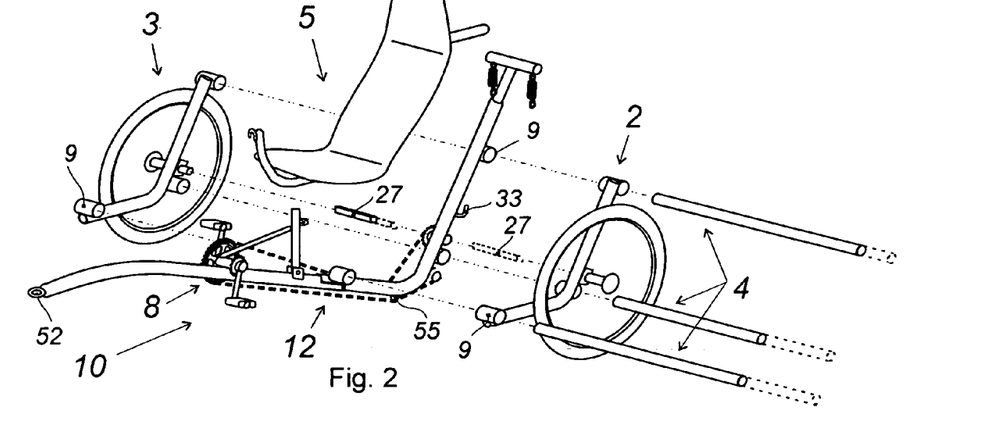
FIG. 2 is an isometric exploded simplified view of the vehicle having a towing powered middle module and special powered wheels.
Figure 3:
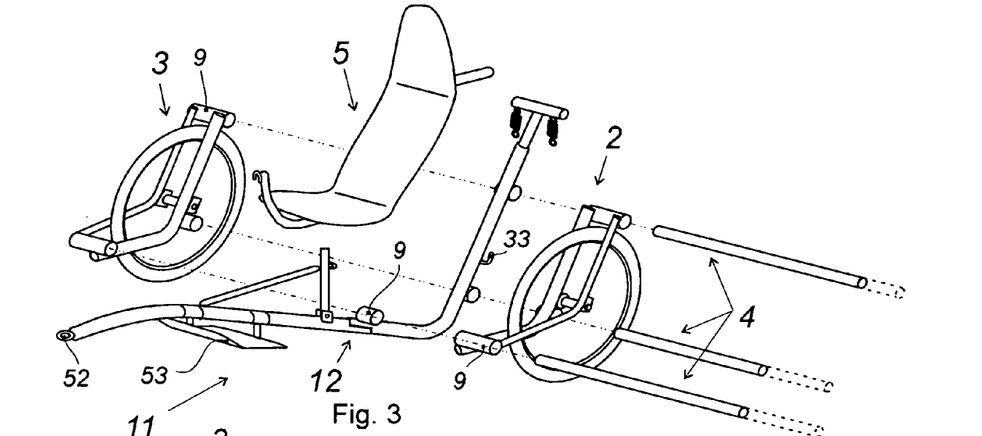
FIG. 3 is an isometric exploded simplified view of the vehicle having a towing unpowered middle module and unpowered wheels.

The middle module has four modifications. The steering middle module 1 in FIG. 1 has a driver's seat 5, steering mechanism 7 operatively coupled with the front steered wheel and a leg operated pedal drive 8 operatively coupled with the left wheel. The towing powered middle module 10 in FIG. 2 has a seat 5 for a driver, pedal chain drive 8 and ring 52 for coupling with tow vehicle. FIG. 2 shows another variant of the pedal transmission which will be described later. FIG. 3 shows the next modification—the towing unpowered middle module 11 which has a passenger seat 5, foot support 53, and a ring 52. The last modification is the towing middle module 13 in FIG. 4 having a ring 52 for hooking up to another vehicle. The vehicle becomes a conventional trailer with ability to carry one or more additional modules. The middle modules shown in FIGS. 1, 2 and 3 have two parts of frame coupled by a folding device 12.

Figure 4:
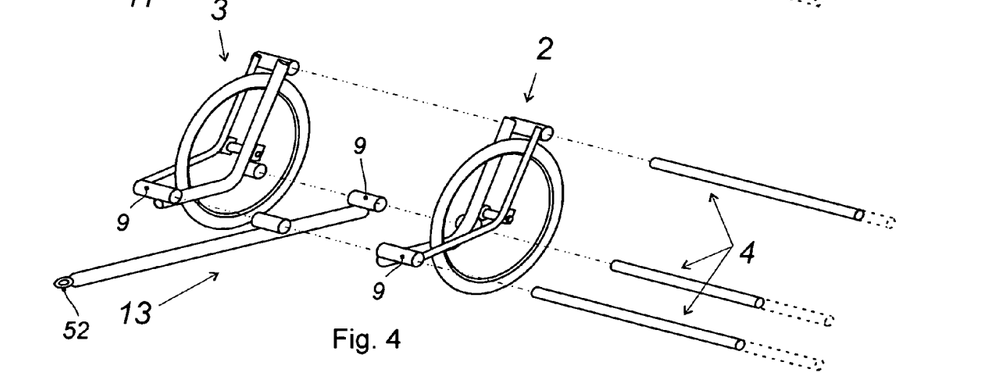
FIG. 4 is an isometric exploded simplified view of the vehicle having a towing middle module.

The left and right modules also have three modifications: a chain driven powered module 2 having a chain transmission as shown in FIG. 1; shaft driven powered modules 2 and 3 in FIG. 2 having special wheels powered via the intermediate shafts 27 directly to the axles of the wheels; and an unpowered module like module 3 in FIG. 1 or modules 2 and 3 in FIGS. 3 and 4.

The following detailed description relates to the vehicle having only modules of basic modifications like shown in FIG. 1.

Figures 5, 6:
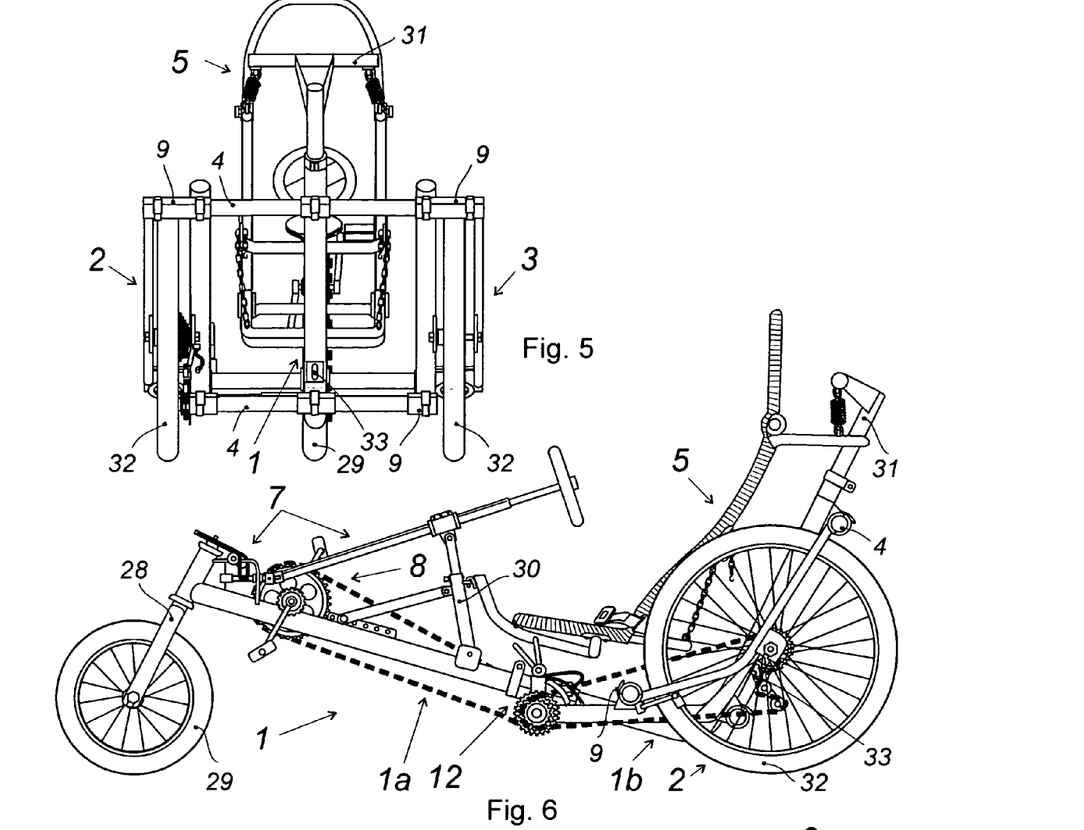
FIG. 5 is a rear view of the vehicle assembled from basic set of modules.
FIG. 6 is a side view of the vehicle assembled from basic set of modules.
Figure 12:
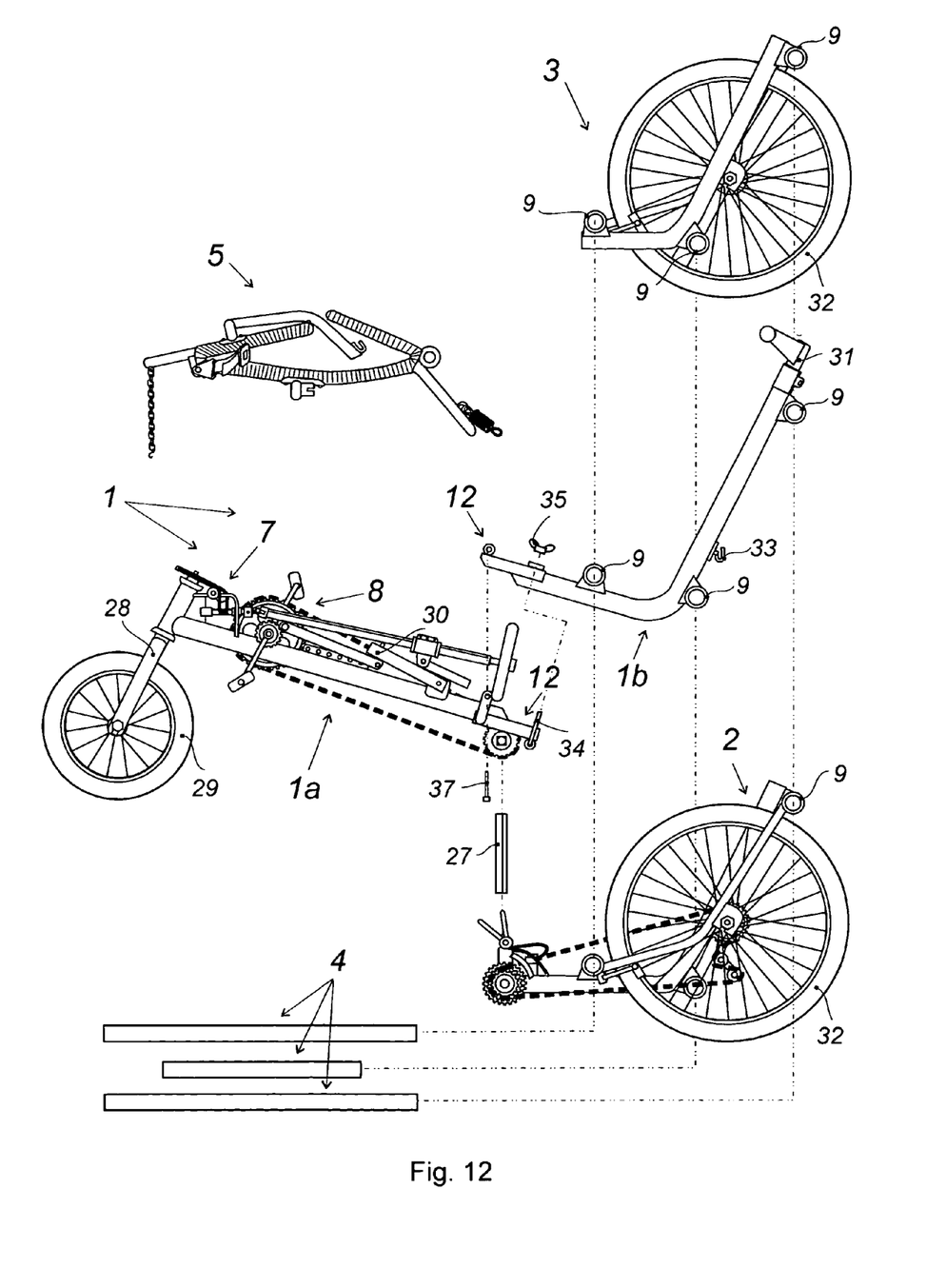
FIG. 12 is a side view of the vehicle in disassembled position for transportation.

The steering middle module 1, better seen in FIGS. 6 and 12, has two parts: front part 1a and back part 1b connected together with a folding device 12. Front part 1a has a frame, fork 28 with the steered wheel 29, steering mechanism 7, chain pedal drive 8 and a support 30. Back part 1b has a frame. three clamping devices 9, seat bracket 31 and a hook 33.

Folding device 12 connects together the front (1a) and back (1b) parts of the middle module. It allows the middle module to be fixed straight for driving, folded for storage, or separated into two parts for transportation.

Figure 9A:
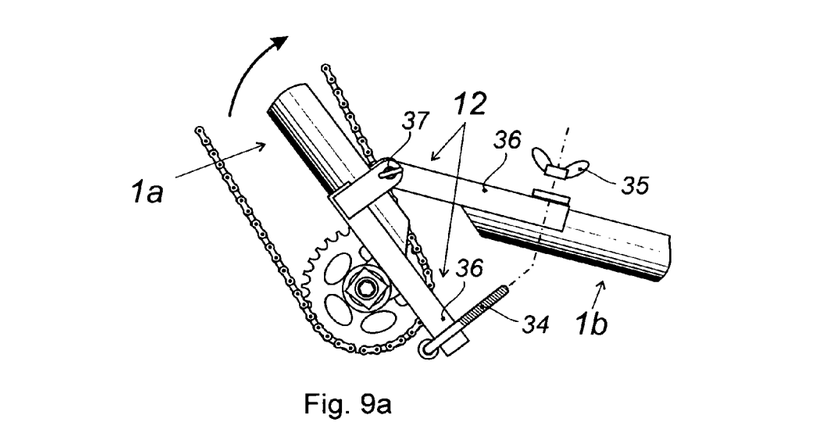
Figure 9B:
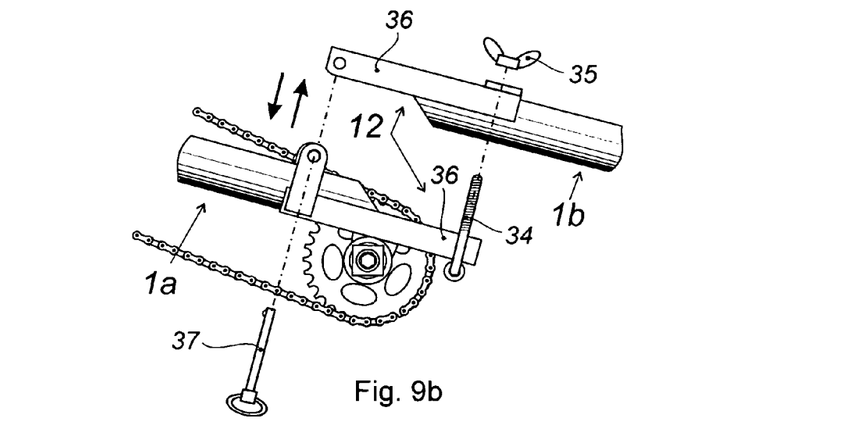
Figure 10:
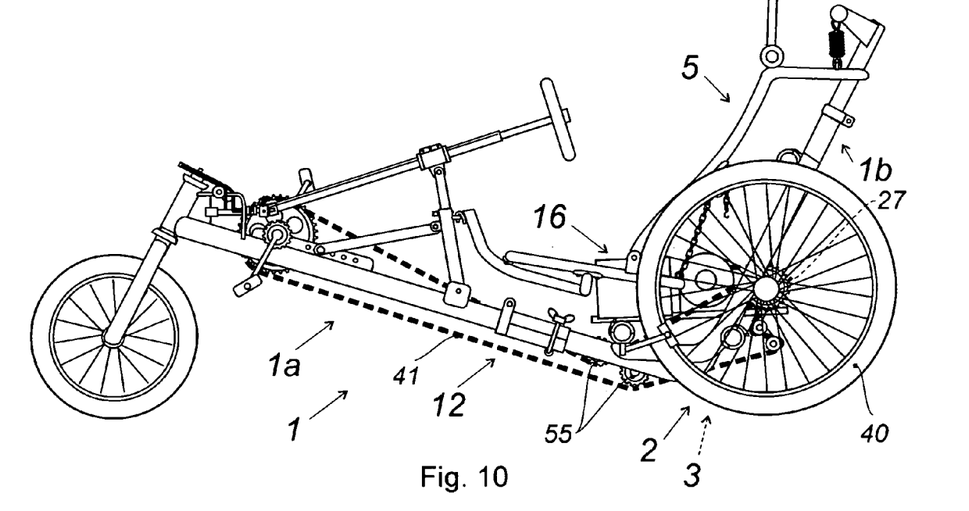
FIG. 10 is a side view of the vehicle having a special rear wheels and one long chain. The vehicle is assembled from the basic set of modules and an additional module—electric drive.
Figure 11:
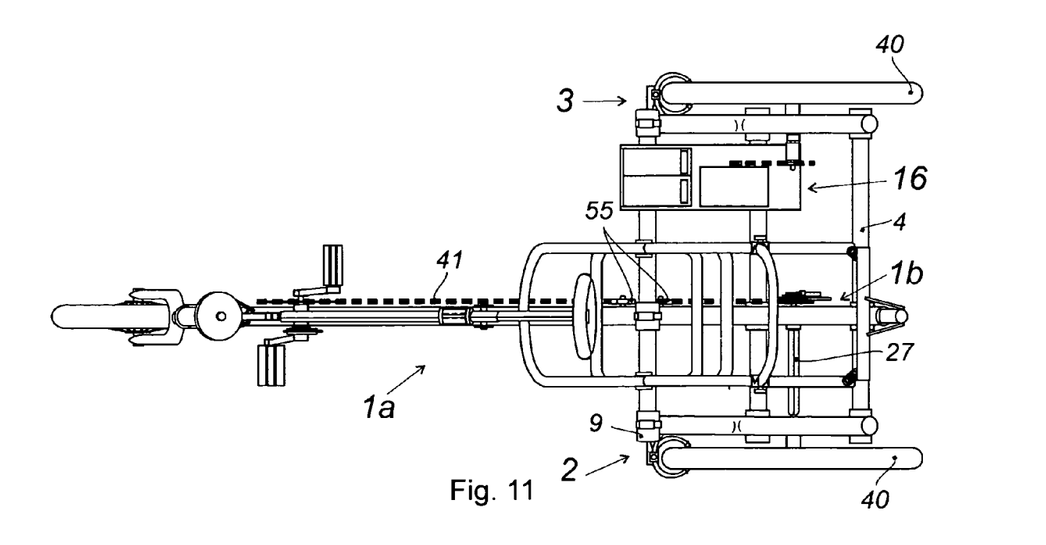
FIG. 11 is a top view of the vehicle having a special rear wheels and one long chain. The vehicle is assembled from the basic set of modules and an additional module—electric drive.

Folding device 12, better shown in FIGS. 9a and 9b, is comprised of two enforcement elements 36 welded to the parts 1a and 1b. The enforcement elements 36 pivotally connected to each other with a pin 37 and fixed by a u-bolt 34 with two wing nuts 35. The folding of the folding device is shown in FIG. 9a, disassembled position—in FIG. 9b. To gain a more compact folding, the pivoting pin 37 has an axis which is not perpendicular to the axis of the frame, this way the middle module folds in two different planes, as better seen in FIGS. 19 and 20.

Figure 7:
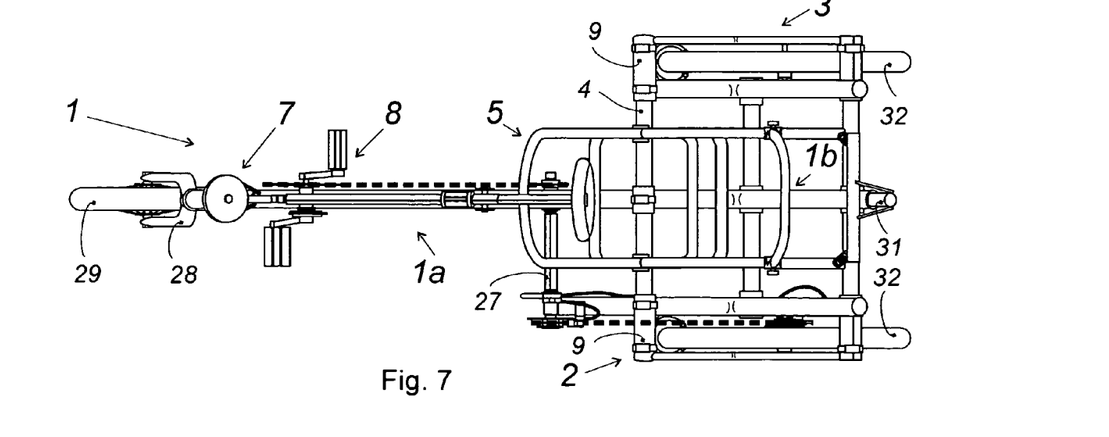
FIG. 7 is a top view of the vehicle assembled from basic set of modules.

Left and right modules 2 and 3, shown in FIGS. 5, 7 and 12, each has a frame and a wheel 32. The chain driven powered module 2 has a wheel 32 with sprocket cassette (like a rear wheel of a bicycle) and a chain transmission. Unpowered module 3 has only the wheel 32 (front wheel of a bicycle)

The basic modification of the Modular Recumbent Vehicle has wheels borrowed from a conventional bicycle. Another possible version of the tricycle has special one-side mounted wheels shown in FIGS. 10 and 11. The vehicle has simplified frames of the left (2) and right (3) modules and only one chain transmission with a long chain 41, guided by idle wheels 55. An intermediate shaft 27 transmits rotation directly to the axle of a wheel 40. The shown trike has an additional electric drive 16 also coupled directly to the axle of the right wheel 40. For folding and disassembling the chain 41 has to be taken out of the pedal wheel.

One or more additional modules can also be attached to the trike. Some of them are shown in FIG. 1: a child pedal drive 15, additional electric drive 16, child seat 17, shopping basket 18, pet cage 19, and passenger stand-seat 20.

Figure 8A:
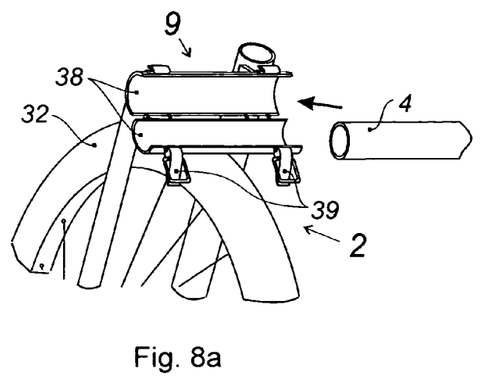
Figure 8B:
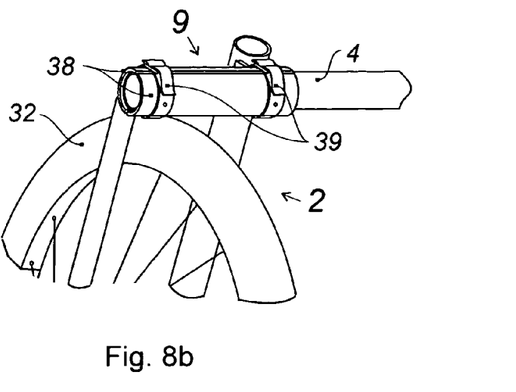

Each of the modules—middle, left, right and the additional module—has standardized clamping devices 9 for fixing to the cross tubes 4. The clamping devices can be short or long; can have hose-type fast clamps, or some kind of bolted clamps. A fast clamping device is shown in FIGS. 8*a* and 8*b*—in opened and in closed positions respectively. It comprises two semi-cylindrical parts 38, one part is welded to the frame of the module 2; another part pivotally connected to the first part and can be fixed in closed position by fast-locking clamps 39.

Cross tubes 4, better seen in FIGS. 1, 7, 12, are thin-walled tubes that connect all modules together. A few sets of cross tubes of different length are necessary to assemble vehicles of different width. Other options are: using telescopically adjustable tubes, or sectional tubes that have thread or some other kind of coupling.

Intermediate shafts 27, as seen in FIGS. 1 and 2, transfer the rotation from a pedal or electric drive to the left or/and right powered wheels. For vehicles of variable width and configuration the shafts should be of variable length as well. It can be a set of square tubes of different length, fitted to the square-shaped ends of the relevant shafts of power transmissions. Another way—intermediate shaft can have telescopically connected sections.

Figure 13A:
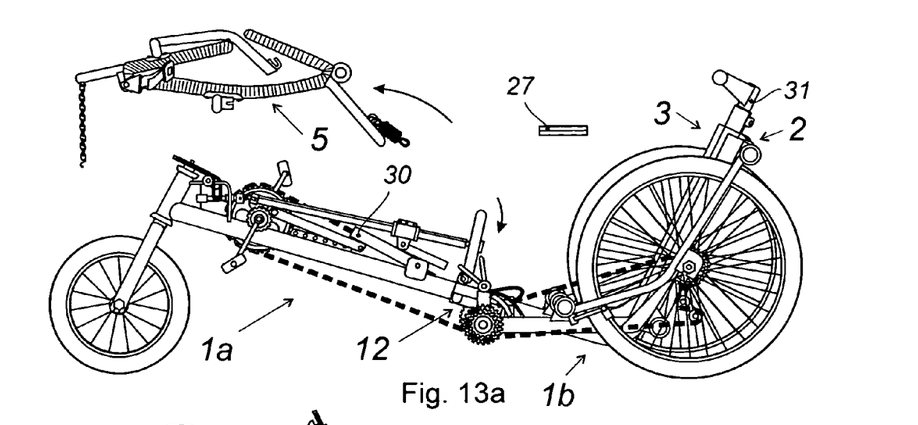
Figures 13B, 14, 15, 16:
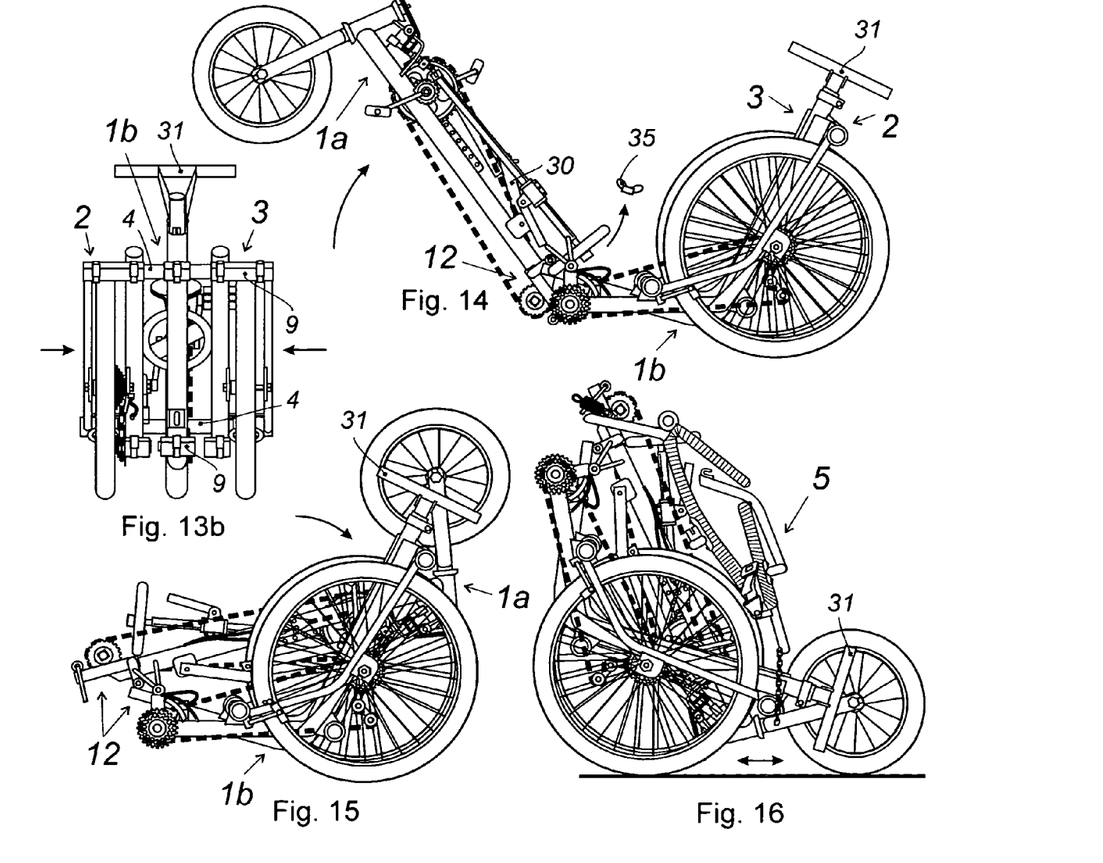
Figure 18:
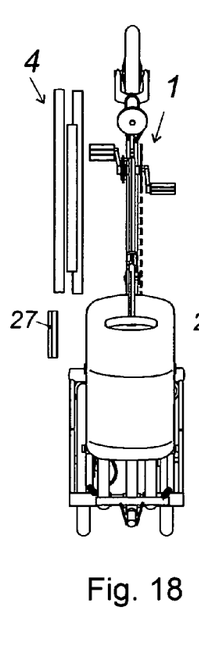
FIG. 18 is a top view of the vehicle assembled from the basic set of modules (narrowed position for storage).

Modular vehicle can be transformed into a compact position for storage. The process of transformation illustrated in FIGS. 13*a* (side view), 13*b* (rear view) and FIGS. 14, 15, 16. All additional modules and seat 5 (see FIG. 13*a*) should be disconnected, support 30—lowered, seat bracket 31—turned 90 degrees, intermediate shaft 27—disconnected. Left (2) and right (3) modules should be shifted as close as possible to the part 1*b* of the middle module and three modules get connected together by two short pieces of cross tubes 4, as better seen in FIG. 13*b*. After removing two nuts 35 from a folding device 12 (FIG. 14), the front part 1*a* of the middle module gets folded close to the back part 1*b* like shown in FIG. 14-15. The parts can be fixed together in this position. The folded vehicle can be turned over and stand on three wheels as shown in FIG. 16, and it also can be moved on these wheels. In some cases only narrowing of the vehicle, like shown in FIGS. 13*a*, 13*b* may be enough for storage. Additional top view of narrowed vehicle is shown in FIG. 18; narrowed vehicle with folded middle module—in FIG. 19.

Figure 20:
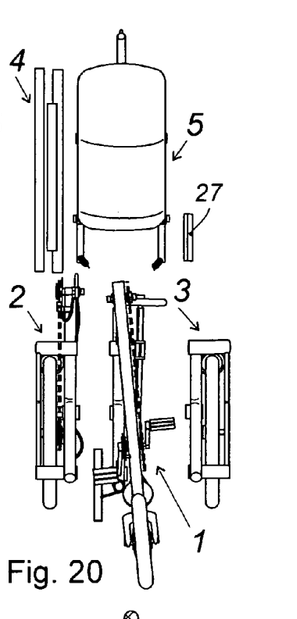
FIG. 20 is a top view of the vehicle comprising of the basic set of modules (disassembled position for transportation).

For transportation inside a trunk of a car the vehicle can be disassembled into few compact parts as shown in FIG. 12. The seat 5 should be disconnected from the support 30 and bracket 31 and folded. All modules 1, 2 and 3 get disconnected from the cross tubes 4. The middle module 1 can be disassembled into two parts 1*a* and 1*b* (FIG. 12), or it can be folded as shown in FIG. 20.

Due to its modular structure the Modular Recumbent Vehicle has a big variety of configurations. The samples of conditions and configurations are presented in FIGS. 17-33 (mainly from the top view).

Figure 17:
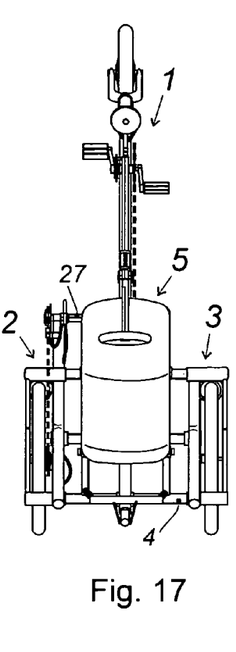
FIG. 17 is a top view of the vehicle assembled from the basic set of modules in driving position.

FIG. 17 shows the vehicle in the normal position for driving.

FIG. 18 shows the tricycle in the narrowed position for storage.

Figure 19:
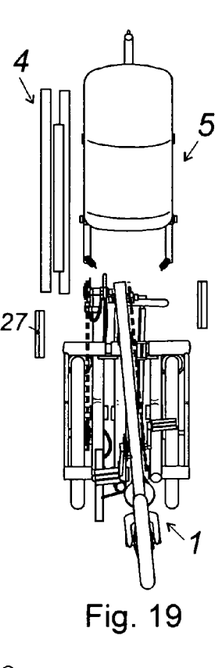
FIG. 19 is a top view of the vehicle assembled from the basic set of modules (folded position for storage).

FIG. 19 shows the vehicle in the narrowed and folded position for storage.

FIG. 20 shows the cycle disassembled for transportation.

Figure 21:
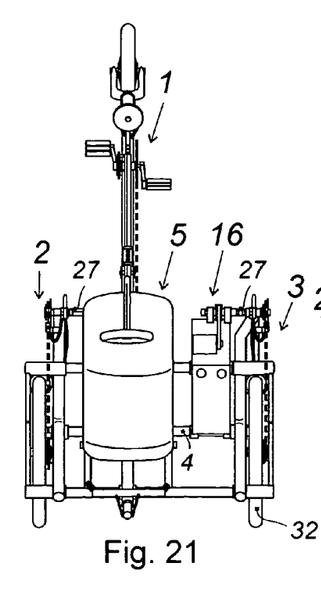
FIG. 21 is a sample of configuration of the vehicle from a top view, assembled from the basic set of modules and an additional module—electric drive.

FIG. 21 shows the vehicle with additional module—electric drive 16 coupled with powered wheel 32 of the right module 3.

Figures 22, 23:
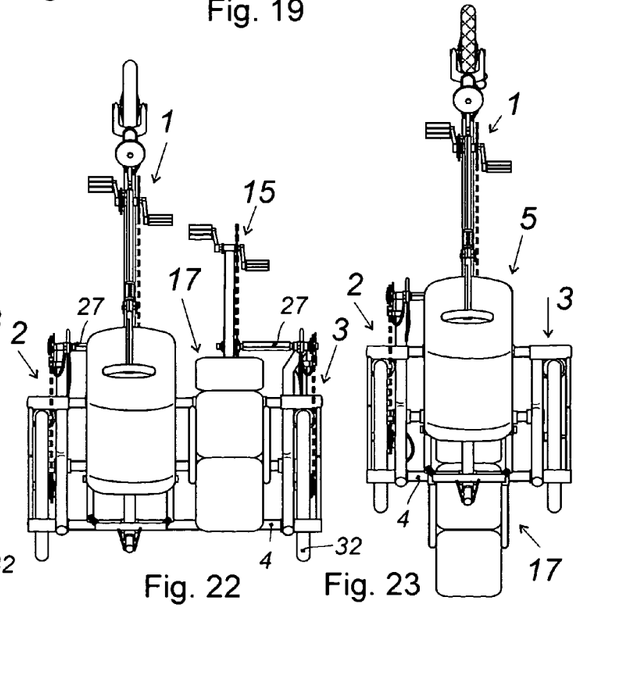
FIG. 22 is a sample of configuration of the vehicle from a top view, assembled from the basic set of modules and additional modules—child seat and child pedal drive.
FIG. 23 is a sample of configuration of the vehicle from a top view, assembled from the basic set of modules and an additional module—child seat (fast back attachment).

FIG. 22 shows the vehicle with a child seat 17 and additional child pedal drive 15 operatively coupled with the wheel 32 through the additional intermediate shaft 27.

FIG. 23 shows the vehicle with the child seat 17 attached behind the driver seat 5 (fast attachment, it is not necessary to use the longer set of cross tubes 4).

Figure 24:
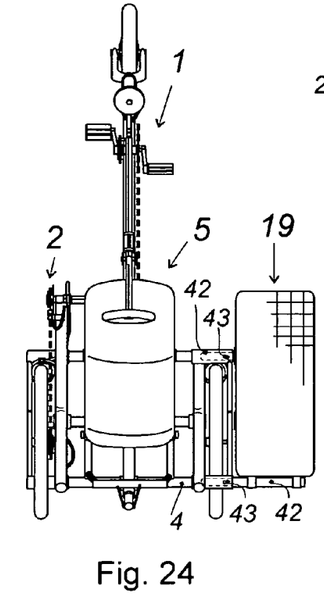
FIG. 24 is a sample of configuration of the vehicle from a top view, assembled from the basic set of modules and an additional module—pet cage (fast side attachment).

FIG. 24 shows the vehicle with an additional module—pet cage 19 (fast side attachment). Side attachment needs two pieces of extension with inner tubes 42, inserted into the cross tubes 4 and fixed by pins 43.

Figure 25:
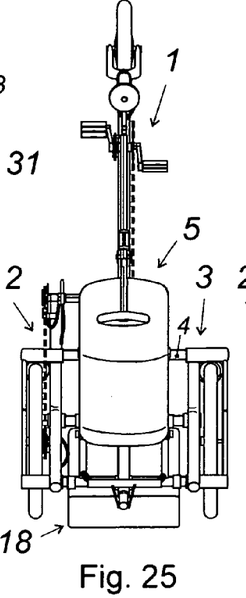
FIG. 25 is a sample of configuration of the vehicle from a top view, assembled from the basic set of modules and an additional module—shopping basket (fast back attachment).

FIG. 25 shows the vehicle with an additional module—shopping basket 18 (fast back attachment).

Figure 26:
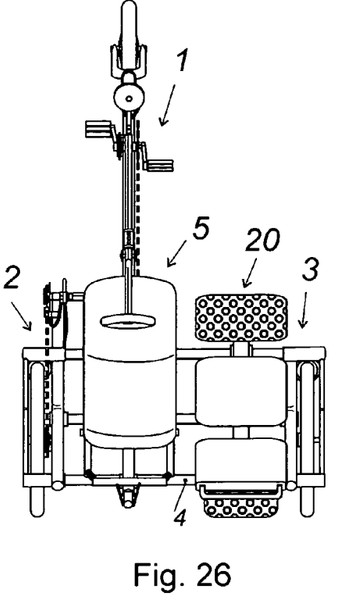
FIG. 26 is a sample of configuration of the vehicle from a top view, assembled from the basic set of modules and an additional module—passenger stand-seat.

FIG. 26 shows the vehicle with an additional module—passenger stand-seat 20.

Figure 27:
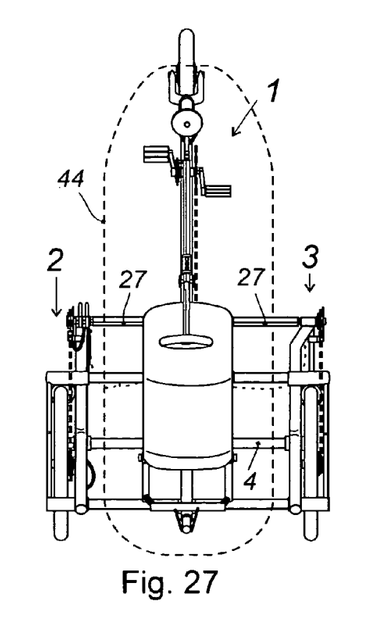
FIG. 27 is a sample of configuration of the high speed and wide vehicle from a top view, assembled from the basic set of modules with left and right driving modules. Further development—install an aerodynamic shell.

FIG. 27 shows the high speed wide vehicle with two powered modules 2 and 3 and two intermediate shafts 27. Further development is an aerodynamic shell 44.

Figure 28:
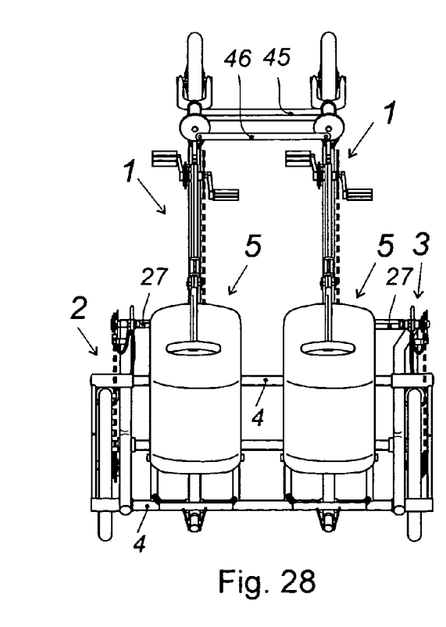
FIG. 28 is a sample of configuration of the two-driver vehicle from a top view, assembled from the basic set of modules and an additional middle module with a seat.

FIG. 28 shows two-driver vehicle having an additional middle module 1 with the seat 5 and two powered modules 2 and 3. For stiffness of the frame and synchronous steering, the vehicle has two links—45 and 46.

Figure 29:
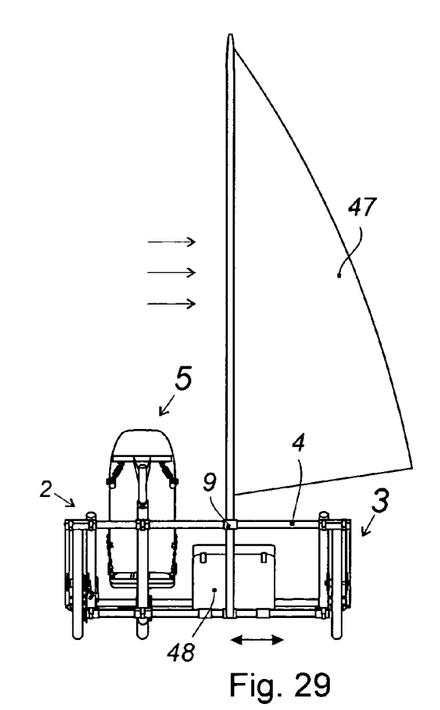
FIG. 29 is a sample of configuration of the of the extra wide land sailing vehicle from a rear view, assembled from the basic set of modules and additional modules—a travel box and a sail.

FIG. 29 shows the rear view of extra-wide land sailing vehicle with additional modules—sail 47 and travel box 48. Depending on the wind direction the sail, seat and box can shift left or right to gain maximum stability.

Figure 30:
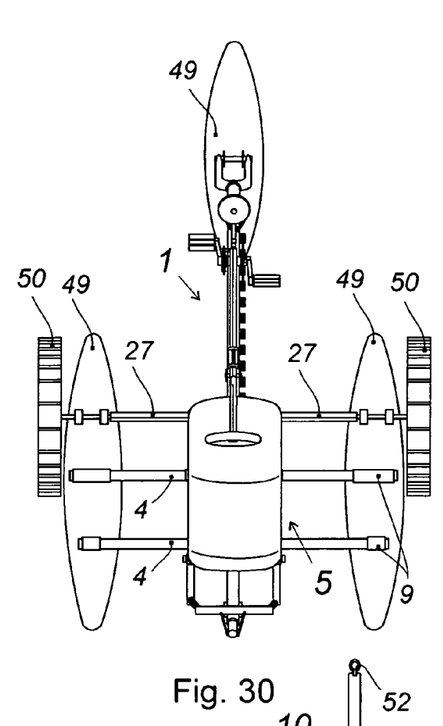
FIG. 30 is a sample of configuration of the extra wide water vehicle from a top view, assembled from the middle module with the seat and additional modules—pontoons and water wheels.

FIG. 30 shows the extra wide water vehicle assembled from a middle module 1 with the seat 5 and additional modules—pontoons 49 and water wheels 50.

Figure 31:
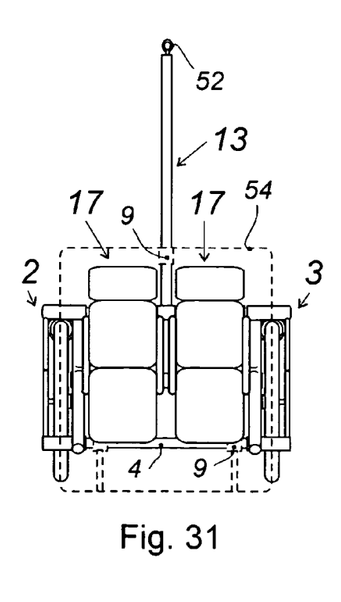
FIG. 31 is a sample of configuration of the trailer for two kids from a top view, assembled from a towing middle module and two child seats.

FIG. 31 shows the trailer for two children having left and right unpowered modules 2 and 3, the set of long cross tubes 4, two child seats 17 and a towing middle module 13. The said middle module has a ring 52 on the front end to hook up to the tow vehicle. The canopy 54 can be fixed by clamping devices 9 to a cross tube 4 and module 13.

Figure 32:
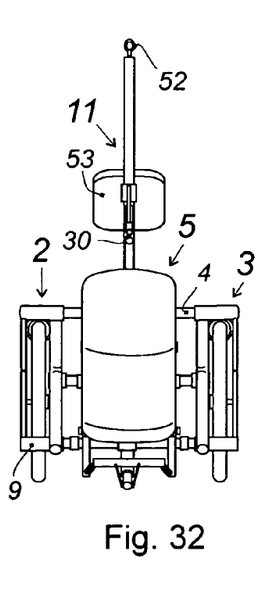
FIG. 32 is a sample of configuration of the trailer for passenger from a top view having a towing unpowered middle module with a seat and foot support.

FIG. 32 shows the passenger trailer having left and right unpowered modules 2 and 3; the set of cross tubes 4; seat 5; towing unpowered middle module 11 with the foot support 53 and ring 52.

Figure 33:
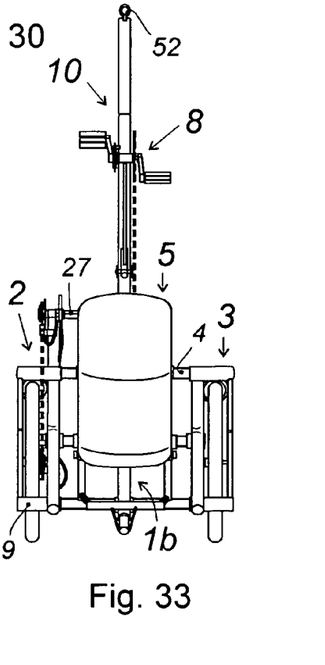
FIG. 33 is a sample of configuration of the powered trailer from a top view, assembled from a towing powered middle module with a seat and pedal chain drive.

FIG. 33 shows the powered trailer having powered left 2 and unpowered right 3 modules; the set of cross tubes 4; the towing powered middle module 10 with the seat 5, the chain pedal drive 8 and ring 52 on the end.

The Modular Recumbent Vehicle can have many other configurations using other additional modules, for example: vendor module, oversize and overweight platforms, high comfort passenger seat, baby multi-seat module, disability adapted seat and so on.

What is claimed is:
1. A modular recumbent vehicle comprising:
at least two identical straight cross elements arranged parallel to each other and disposed at longitudinal positions, horizontally and perpendicular to direction of driving, wherein the length of each of said cross elements is variable and wherein each of said cross elements includes a left portion, a right portion and a middle portion;

a left module having a longitudinal left frame, a left wheel being rotatably mounted to said left frame and at least two clamping devices mounted to the left frame at longitudinal positions identical to the longitudinal positions of said cross elements, wherein each clamping device is attachable to and detachable from a corresponding cross element such that said left module can be attached to and detached from any position within the left portion of the cross elements;

a right module having a longitudinal right frame, a right wheel being rotatably mounted to said right frame and at least two clamping devices mounted to the right frame at longitudinal positions identical to the longitudinal positions of said cross elements, wherein each clamping device is attachable to and detachable from a corresponding cross element such that said right module can be attached to and detached from any position within the right portion of the cross elements;

at least one middle module having a longitudinal middle frame, a seat mounted to said middle frame and at least two clamping devices mounted to the middle frame at longitudinal positions identical to the longitudinal positions of said cross elements, wherein each clamping device is attachable to and detachable from a corresponding cross element such that said middle module can be attached to and detached from any position within the middle portion of the cross elements;

at least one additional module for performing one of the following additional special tasks: transportation of passengers, transportation of goods, using additional drives and using additional conveniences; wherein said additional module has a frame and at least two clamping devices mounted to said frame at longitudinal positions identical to the longitudinal positions of said cross elements, and wherein each clamping device is attachable to and detachable from a corresponding cross element such that said additional module can be additionally attached to and detached from any position within any of the middle, left and right portion of the cross elements, and wherein said additional module is one of the following: a passenger stand-seat, a child seat, a child cabin, a child pedal drive, a pet cage, a shopping box, a carriage platform, an electric drive, a sail, an aerodynamic shell, a canopy, and a travel box; and at least one intermediate shaft operatively connecting two modules, wherein said intermediate shall has a first end and a second end, said first end operatively connected to either the middle module or the additional module and said second end operatively connected to either the left or right module for transmitting rotation from either the middle module or the additional module to either the left or right module.

2. The modular recumbent vehicle of claim 1 wherein each clamping device comprises a channel element mounted to respective ones of said frames and having inner size and shape suitable to engage an outer surface of a respective cross element, and at least one hand-tightening clamp which can be in closed and open position such that said channel element can be attached and tightened to and loosened and detached from the cross element.

3. The modular recumbent vehicle of claim 1 wherein the left module is one of the following:
   a powered left module with a power transmitting device mounted to the left frame for transmitting rotation to the left wheel; and
   an unpowered left module wherein the left wheel is unpowered.

4. The modular recumbent vehicle of claim 1 wherein the right module is one of the following:
   a powered right module with a power transmitting device mounted to the right frame for transmitting rotation to the right wheel; and
   an unpowered right module wherein the right wheel is unpowered.

5. The modular recumbent vehicle of claim 1 wherein the middle module is one of the following:
   a steering middle module comprising a leg operated chain pedal drive mounted to the middle frame and operatively coupled to the intermediate shaft, a steered wheel being rotatably and turnably mounted to the front end of the middle frame and a hand operated steering mechanism operatively coupled to said steered wheel for turning the steered wheel; and
   a towing middle module comprising a hitching device mounted to the front end of the middle frame.

6. The vehicle of claim 5 wherein said middle module further comprises a front part and a back part and wherein said front and back parts are coupled together by a pivotal connector configured to permit the front and back parts to move such that the middle module may be moved between an opened position wherein the front and back parts are extended away from each other, a folded position wherein the front and back parts are folded adjacent to each other, and a disconnected position wherein the front and back parts are taken apart.

* * * * *